June 23, 1942. H. REICHELT ET AL 2,287,486
PROCESS FOR REMOVING SILICIC ACID FROM WATER
Filed Aug. 25, 1939
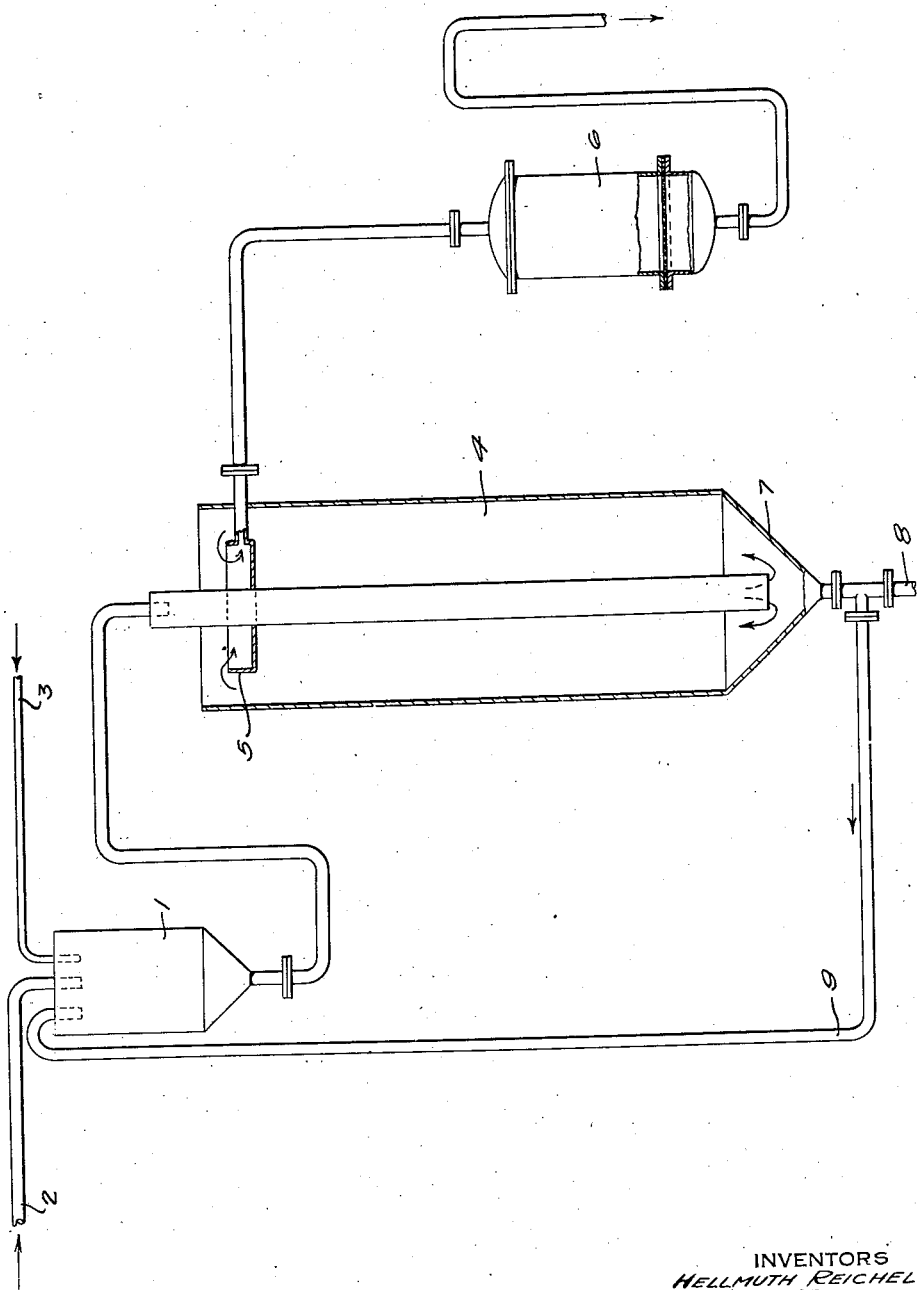
INVENTORS
HELLMUTH REICHELT
HANS ZIRNGIBL
BY
THEIR ATTORNEYS Patented June 23, 1942

2,287,486

UNITED STATES PATENT OFFICE 2,287,486

PROCESS FOR REMOVING SILICIC ACID FROM WATER

Hellmuth Reichelt, Bitterfeld, and Hans Zirngibl, Wolfen, Kreis Bitterfeld, Germany Application August 25, 1939, Serial No. 291,930
In Germany September 19, 1938

2 Claims. (Cl. 210—23)

The present invention relates to a process of freeing water from silicic acid.

The use of siliceous water in boiler plants leads to the formation of a very hard scale and, moreover, to the incrustation of turbines arranged in series. Especially in high pressure steam installations, this latter inconvenience is very annoying. Experience has shown that the incrustation of turbines mounted in series due to the presence of silicic acid does not occur, in case the concentrated boiler-water does not contain more than 5 mgs. of silicic acid per litre. For this purpose it is necessary that the content of silicic acid of the feed water for the boilers does not exceed 0.5 mg./l.

Several processes have already been proposed for freeing water from silicic acid, but the above inconveniences have not been completely avoided; in particular, it was not possible to attain the above-indicated minimum content by means of these processes. It has, for instance, been proposed to eliminate the silicic acid by means of magnesium aluminates containing at most 1 mol of magnesium oxide per 1 mol of aluminum oxide. The results obtained with this process are, however, not sufficient.

Attempts have, furthermore, been made to eliminate the silicic acid by the aid of sodium aluminate only; in this process, there remain still 2 mgs. of silica acid per litre of water. With the aid of mixtures of different metal hydroxide gels it is possible to eliminate the silicic acid to 1 milligram per litre of feed water, but even this result does not meet the actual requirements.

Now we have found that the silicic acid may be eliminated with the exception of a few tenths of milligrams per litre by treating the water at pH-values between 7 and 9 with magnesium aluminates which contain about 2 mols of magnesium oxide per 1 mol of aluminum oxide. On preparing the aluminates in water the magnesium oxide already present in the water has to be taken into consideration. A special advantage of this mode of working resides in the fact that the elimination of silicic acid may be effected with the same good result in the cold as well as in the heat.

It is, furthermore, possible to increase the degree to which the water is freed from silicic acid, while reducing the consumption of chemicals, by intimately mixing the water to be treated, at the same time, with sludge which has already been precipitated. The clarification obtained in the settling tank is, in this manner, likewise improved to a considerable degree. Instead of the sludge resulting from a previous operation there may naturally be used a corresponding purifying mass which has been prepared synthetically.

The lime treatment to which some sorts of water must be subjected in order to remove therefrom the carbonates, may be effected either before the elimination of silicic acid or simultaneously with it.

The process is preferably performed in the following manner: a solution of a magnesium salt, such as magnesium chloride or magnesium sulfate, and sodium aluminate is added to the water to be treated, the proportion of the two salts being chosen in such a manner that about 2 mols of magnesium oxide are present in the water per each mol of aluminum oxide. The solution is then, in known manner, adjusted to the optimal pH-value.

Instead of sodium aluminate there may also be used other aluminates, or the latter may be prepared from salts of aluminium such as, for instance, aluminium chloride, aluminium sulfate and alums, the pH-value being regulated accordingly, by addition of, for instance, a caustic soda solution or lime and then, instead of magnesium chloride or magnesium sulfate, there may be added magnesium oxide, magnesium hydroxide or other basic salts of magnesium. Up to 0.1 mol of the magnesium salts may be substituted by iron salts.

In the processes described in the following examples there is used a purification device having the usual commercial size and structure. A suitable apparatus is illustrated diagrammatically in the accompanying drawing wherein 1 is the mixing vessel, 2 is a pipe for supplying water to be purified, 3 is the supply pipe for the treating chemicals, 4 is the purification vessel in which the chemicals have an opportunity to react forming a sludge which settles out. 5 is the overflow for the discharge of purified water and 6 is a filter for separating any residual sludge contained in the water passing the overflow. 7 is the bottom of the purification device which is of conical shape to assist in the discharge of the sludge either to waste as at 8 or to pipe 9 which serves to reconduct the sludge to the mixing receptacle 1. It is to be understood that this drawing is simply illustrative of a suitable apparatus for carrying out the present process and that other arrangements within the skill of the art may be used with equal effect. In the mixing vessel the water is mixed with the chemicals indicated in the examples and, likewise, with the sludge which has been withdrawn from the lower cone of the purification device and has been extracted by means of air. As soon as the water has passed the purification device, the residual sludge is separated in a filter filled with a magnesite the grains of which have a size of 2 mm. The numbers indicated in the examples are average values obtained by means of several hours' tests.

The following examples illustrate the invention:

*Example 1.*—The purifying device is charged with water from the Mulde River having a temperature of 20° C., in such a manner that the water remains in the apparatus for two hours. If the water is treated with magnesium chloride only (Test 2), there remain per litre 3 mgs. of silicic acid; in the case of sodium aluminate only (Test 1), the residual content of silicic acid amounts to 2 mgs. per litre; when treating the water, according to the present invention, simultaneously with both of these chemical agents (Tests 3 and 4), the quantity of silicic acid which remains in the water amounts to 0.3 mg. per litre. In order to attain this value without intimately mixing the water with sludge which has already been precipitated, there are required 250 grams of sodium aluminate per cubic metre of water (Test 3). If the sludge is reconducted into the process (Test 4), the same effect is obtained with only 94 grams of sodium aluminate per m.$^3$ of water. If equivalent quantities of barium aluminate and magnesium sulfate are used the silicic acid is eliminated to the same extent (Test 5). The following table is a self-explanatory summary of the complete data on the several tests mentioned above.

Table I

|  | Test 1 | Test 2 | Test 3 | Test 4 | Test 5 |
|---|---|---|---|---|---|
| Crude water: |  |  |  |  |  |
| Total hardness parts per million | 50 | 64 | 58 | 78 | 70 |
| Hardness owing to the presence of magnesium oxide parts per million | 15 | 17 | 17 | 12 | 28 |
| SiO$_2$ mgs./l | 9 | 10 | 9 | 8.5 | 8 |
| Additions: |  |  |  |  |  |
| Sodium aluminate g./m.$^3$ | 500 |  | 250 | *94 |  |
| MgCl$_2$ g./m.$^3$ |  | 172 | 172 | 60 |  |
| Barium aluminate g./m.$^3$ |  |  |  |  | 200 |
| MgSO$_4$ g./m.$^3$ |  |  |  |  | 180 |
| Molecular proportions: |  |  |  |  |  |
| Al$_2$O$_3$ | 2.2 |  | 1.1 | 0.41 | 0.7 |
| MgO (added) |  | 1.8 | 1.8 | 0.63 | 0.73 |
| MgO (already present in the water) | 0.28 | 0.3 | 0.3 | 0.2 | 0.5 |
| MgO:Al$_2$O$_3$ |  |  | 1.9 | 2.02 | 1.76 |
| Pure water: |  |  |  |  |  |
| Total hardness parts per million | 32 | 95 | 58 | 69 | 56 |
| pH-value | 8.5 | 8.5 | 8.5 | 8.3 | 8.1 |
| SiO$_2$ mg./l | 2 | 3 | 0.3 | 0.3 | 0.3 |

*In case the sludge is reconducted into the process.

*Example 2.*—Tap water having a total hardness of 121 P. P. M., a hardness of 11 P. P. M. due to the presence of magnesium oxide and a content of 8.7 mg./l. of silicic acid is treated for 2 hours with 94 grams of sodium aluminate per cubic metre and 63 grams of magnesium chloride per cubic metre, while being mixed with sludge which has already been precipitated. After filtering, the water has a pH-value of 8.5, a total hardness of 104 P. P. M. and a content of silicic acid of 0.17 mg./l. The complete data on this run is summarized in the following table.

Table II

Crude water:
   Total hardness__(parts per million)__ 121
   Hardness due to the presence of magnesium oxide_____(parts per million)__ 11
   SiO$_2$ _____mg./l__ 8.7
Additions:
   Sodium aluminate_____g./m.$^3$__ *94
   MgCl$_2$ _____g./m.$^3$__ 63
Molecular proportions:
   Al$_2$O$_3$ _____ 0.41
   MgO (added)_____ 0.65
   MgO (already present in the water)__ 0.2
   MgO:Al$_2$O$_3$ _____ 2.07
Pure water:
   Total hardness_____(P. P. M.)__ 104
   pH-value _____ 8.5
   SiO$_2$ _____mg./l__ 0.17

* In case the sludge is reconducted into the process.

*Example 3.*—Water from the Saale River having a total hardness of 303 P. P. M. and a content of silicic acid of 8.7 mg./l. is, in view of its high degree of hardness due to the presence of carbonates, subjected in known manner to a lime treatment. The water which runs off and which shows a feebly alkaline reaction is, without any previous treatment, mixed with 148 grams of sodium aluminate per cubic metre and 126 grams of magnesium chloride per m.$^3$. The water remain in the apparatus for about one hour. The sludge is removed by means of a filter filled with granulated marble. The water thus treated contains per litre 0.5 mg. of silicic acid; if the water is mixed, at the same time, with sludge which has already been precipitated, only 132 grams of sodium aluminate and 108 grams of magnesium chloride are required per cubic metre for obtaining, after filtering, a residual content of silicic acid of 0.35 mg./l. The complete data on these two runs is summarized in Table III.

Table III

|  | Test 1 | Test 2 |
|---|---|---|
| Crude water: |  |  |
| Total hardness_____parts per million | 302 | 304 |
| Total hardness after the lime treatment parts per million | 192 | 190 |
| SiO$_2$ mg./l | 8.8 | 8.5 |
| Additions: |  |  |
| Sodium aluminate g./m.$^3$ | 148 | *132 |
| MgCl$_2$ g./m.$^3$ | 126 | 108 |
| Molecular proportions: |  |  |
| Al$_2$O$_3$ |  |  |
| MgO (added) | 0.65 | 0.58 |
| Mg (already present in the water) | 1.32 | 1.14 |
| MgO:Al$_2$O$_3$ | 2.04 | 1.94 |
| Pure water: |  |  |
| Total hardness_____parts per million | 185 | 170 |
| pH-value | 8 | 8 |
| SiO$_2$ mg./l | 0.5 | 0.35 |

*In case the sludge is reconducted into the process.

The invention is of course not limited to the specific details described, for obvious modifications may occur to a person skilled in the art.

What we claim is:

1. A process for removing silicic acid from water which comprises treating the water at pH-values between 7 and 9 with magnesium aluminates containing about 2 mols of magnesium oxide per 1 mol of aluminium oxide and separating the resultant sludge from the water.

2. A process for removing silicic acid from water which comprises treating the water at pH-values between 7 and 9 with magenisum aluminates containing about 2 mols of magnesium oxide per 1 mol of aluminium oxide, separating the sludge formed during the elimination of silicic acid from the water and reconducting said sludge into the process by adding it to fresh water from which silicic acid is to be removed.

HELLMUTH REICHELT.
HANS ZIRNGIBL.